United States Patent Office 2,960,433
Patented Nov. 15, 1960

2,960,433
METHOD OF CONTROLLING THE GROWTH OF MICROORGANISMS WHICH COMPRISES APPLYING 2,2,6-TRIMETHYL-TETRAHYDRO-1,3-OXAZINE

Jamal S. Eden, Akron, Ohio, assignor to Diamond Alkali Company, Cleveland, Ohio, a corporation of Delaware No Drawing. Filed Dec. 5, 1956, Ser. No. 626,282

1 Claim. (Cl. 167—33)

This invention relates to novel alkyl and aryl-substituted tetrahydro-1,3-oxazines and 1,3-oxazolidines, their preparation and application.

More particularly, the present invention relates to compounds having the structure

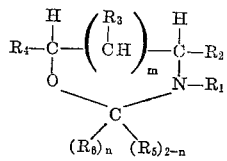

wherein $R_1$, $R_2$, $R_3$, $R_4$, $R_5$ and $R_6$ are the same or different radicals selected from the group consisting of hydrogen, alkyl radicals, such as methyl, ethyl, propyl, butyl, amyl, decyl, heptadecyl, isopropyl and other isomers of the foregoing, especially lower alkyl radicals as are exemplified herein, and aryl radicals, e.g., phenyl, $m$ is a number from 0 to 1, inclusive, and $n$ is a number from 0 to 1, inclusive. A more specific, and at present a preferred type substance of the above general structure, comprises a compound wherein $R_6$ is a phenyl group.

Specific illustrative compounds of the above type are:
2-methyl-2-heptadecyl-3-isopropyloxazolidine
2-phenyl-3-isopropyl oxazolidine
2-methyl-2-n-pentadecyl-3-isopropyloxazolidine
2,6-dimethyl-2-heptadecyl-3-isopropyltetrahydro-1,3-oxazine
2,2,6-trimethyltetrahydro-1,3-oxazine
2-ethyl-2,5-dimethyl-1,3-oxazolidine
2,2-dimethyltetrahydro-1,3-oxazine Compounds of the present invention generally exhibit biological activity and are useful in various applications, e.g., as bactericides, miticides, and the like.

Compounds of this invention may be prepared by refluxing an appropriately-substituted amino alkanol, e.g., an alkyl-substituted ethanolamine or propanolamine, with an aldehyde or ketone. For example, an alkyl-substituted propanolamine can be reacted with acetone or 2-nonadecanone to form a substituted tetrahydrooxazine. Similarly, 2-nonadecanone and N-isopropylethanolamine can be refluxed, e.g., in xylene, to form an alkyl-substituted oxazolidine.

In order that those skilled in the art may more completely understand the present invention and the preferred methods by which the same may be carried into effect, the following specific examples are offered:

EXAMPLE I

Preparation of 2-methyl-2-heptadecyl-3-isopropyl-oxazolidine

A mixture of 36 gms. (0.35 mol) N-isopropylethanolamine, 98.7 gms. (0.35 mol) of 2-nonadecanone and 200 ml. of xylene is refluxed under a water trap for 5 hours while 10 ml. of water is collected. The xylene is then removed by distillation and the resultant material solidifies. This product is separated by filtration, dried and weighs 103 gms. The solid is recrystallized once from benzene to yield a white solid melting at 52°–54° C. and weighing 58 gms.

Chemical analysis of this product indicates preparation of the desired $C_{24}H_{49}NO$ and is as follows:

| Element | Percent Actual | Percent Calculated |
|---|---|---|
| C | 78.12 | 78.47 |
| H | 13.22 | 13.35 |

EXAMPLE II

Part A—Preparation of 2-phenyl-3-isopropyl oxazolidine

A mixture of 61.8 gms. (0.6 mol) of N-isopropylethanolamine, 63.6 gms. (0.6 mol) of benzaldehyde and 300 ml. of benzene is refluxed for 5 hours under a water trap while 11 ml. of water is collected. The benzene is then removed by distillation. The resultant product is vacuum distilled at 95° C. at 1.2 mm. Hg to yield a yellowish solid weighing 78.6 gms. Chemical analysis of this material is as follows and indicates preparation of the desired $C_{12}H_{17}NO$:

| Element | Percent Actual | Percent Calculated |
|---|---|---|
| C | 75.26 | 75.39 |
| H | 8.94 | 8.90 |

Part B

The product of Part A is mixed with distilled water containing 5% acetone and 0.01% Triton X-155 at a concentration of 1000 p.p.m. Two ml. of the test formulation are put in each of 4 test tubes. To each test tube is added 0.5 ml. of a culture broth of one of the following organisms: Erwenia amylovora, Xanthomonas phaseoli, Staphylococcus aureus and Escherichia coli. The tubes are then incubated for 24 hours at 37° C. Transfers are then made to sterile broth with a standard 4 mm. loop and the inoculated broth incubated for 48 hours at 37° C. at which time growth is rated as follows: A=no growth, B=slight, C=moderate and D=heavy growth. Using the above procedure, the product of Part A exhibits a rating of A against each of the organisms tested, thus indicating significant bacterial toxicant activity.

EXAMPLE III

Preparation of 2-methyl-2-n-pentadecyl-3-isopropyl oxazolidine

A mixture of 36 gms. (0.35 mol) of N-isopropylethanolamine, 89 gms. (0.35 mol) of 2-heptadecanone and 200 ml. of xylene is refluxed for 6 hours under a water trap while 8 ml. of water is removed. The xylene is then removed by distillation and upon cooling, the residue solidifies. This product is recrystallized from benzene to yield a white solid weighing, after drying, 53 gms. and melting at 43.5–45° C. Chemical analysis of this material is as follows indicating the preparation of the desired $C_{22}H_{45}NO$:

| Element | Percent Actual | Percent Calculated |
|---|---|---|
| C | 78.89 | 77.88 |
| H | 12.83 | 13.27 |

EXAMPLE IV

*Preparation of 2,6-dimethyl-2-heptadecyl-3-isopropyltetrahydro-1,3-oxazine*

A mixture of 0.5 mol of N-isopropyl-4-amino-2-butanol, 141.25 gms. (0.5 mol) of 2-nonadecanone and 100 ml. of xylene is refluxed for 10 hours under a water trap while 7 ml. of water is collected. After removing solvent, the product is vacuum distilled at 255° C. at 10 mm. Hg and solidifies on cooling. Chemical analysis of this material, which weighs 75 gms. indicates preparation of the desired $C_{26}H_{53}NO$:

| Element | Percent Actual | Percent Calculated |
|---|---|---|
| C | 79.50 | 79.20 |
| H | 12.99 | 13.28 |

EXAMPLE V

*Part A—Preparation of 2,2,6-trimethyltetrahydro-1,3-oxazine*

A mixture of 89 gms. (1 mol) of 4-amino-2-butanol, 58 gms. (1 mol) of acetone and 200 ml. of benzene is refluxed for 3 hours under a water trap while 20 ml. of water is collected. The benzene is then removed by distillation. The resultant product is vacuum distilled to yield a liquid fraction weighing 31.9 gm. and boiling at 28–30° C. at 1 mm. Hg and having a refractive index of 1.448. Chemical analysis of this sample indicates preparation of the desired $C_7H_{15}NO$ and is as follows:

| Element | Percent Actual | Percent Calculated |
|---|---|---|
| C | 64.51 | 65.12 |
| H | 11.93 | 11.53 |

*Part B*

The test chemical is mixed with distilled water containing 5% acetone and 0.01% Triton X–155 at a concentration of 1000 p.p.m. Two ml. of this test formulation are put in each of 4 test tubes. To each test tube in the set is added 0.5 ml. of culture broth of one of the following organisms: *Erwenia amylovora, Xanthomonas phaseoli, Staphylococcus aureus* and *Escherichia coli*. The tubes are then incubated for 24 hours at 37° C. Transfers are then made to sterile broth with a standard 4 mm. loop and the thus-inoculated broth incubated for 24 hours at 37° C., at which time growth is rated as follows: A=no growth, B=slight, C=moderate and D=heavy growth.

Using the above procedure, a rating of A is obtained with the product of Part A against each of the test organisms indicating high bacterial toxicant activity.

EXAMPLE VI

*Part A—Preparation of 2-ethyl-2,5-dimethyl-1,3-oxazolidine*

A mixture of 150 gms. (2 mols) of isopropanolamine, 187.4 gms. (2.6 mol) of methyl ethyl ketone and 400 ml. of benzene is refluxed under a water trap for 4 hours while 41 ml. of water is collected. The benzene is then removed by distillation and the residue distilled at 28° C. at 1–2 mm. Hg, as a colorless liquid in 77.7% yield. Chemical analysis of this product corresponds to the desired $C_7H_{15}NO$ and is as follows:

| Element | Percent Actual | Percent Calculated |
|---|---|---|
| N | 10.40 | 10.87 |

*Part B*

Employing the product of Part A as a 25% wettable powder or dispersed in water at a concentration of 1% actual chemical and applied by dipping greenhouse red spider mite-infested cranberry bean plants therein, 72 hours after such treatment an 84.3% insect mortality is observed without plant injury, thus indicating a high degree of insecticidal activity. An untreated plant exhibits a 7.1% insect mortality.

EXAMPLE VII

*Part A—Preparation of 2,2-dimethyltetrahydro-1,3-oxazine*

A mixture of 150 gms. (2 mols) of 3-amino propanol, 116 gms. (2 mols) of acetone and 200 ml. of benzene is refluxed, using a water trap, for six hours during which time 40 ml. of water is separated. The benzene is then removed by distillation and the remainder of the reaction mixture vacuum distilled (71°–73° C. at 10 mm. Hg) to yield a yellowish liquid weighing 108 gms.

Chemical analysis of this product indicates preparation of the desired $C_6H_{13}NO$ and is as follows:

| Element | Percent Actual | Percent Calculated |
|---|---|---|
| C | 62.62 | 62.61 |
| H | 11.63 | 11.80 |

*Part B*

The product of Part A is mixed with distilled water, containing 5% acetone and 0.01% Triton X–155, at a concentration of 1,000 p.p.m. Two ml. of this test formulation are put in each of 4 test tubes. To each test tube is added 0.5 ml. of culture broth of a different test organism. The following organisms will be used: *Erwenia amylovora, Xanthomonas phaseoli, Staphylococcus aureus* and *Escherichia coli*. The first two organisms are plant pathogens. The tubes are then incubated for 24 hours at 37° C. Transfers are then made to sterile broth with a standard 4 mm. loop and incubated for 48 hours at 37° C. when growth is rated as follows: A=no growth, B=slight, C=moderate and D=heavy growth.

Using the above procedure, the product of A exhibits a rating against the above organisms respectively of B, A, A, and A, thus indicating a high degree of bactericidal activity.

Compounds of this invention may be employed in a variety of formulations, both liquid and solid, including finely-divided powders, granular materials, as well as various liquid solutions, concentrates, emulsifiable concentrates, slurries, and the like, depending upon the application intended and the formulation media employed.

Hence, it will be appreciated that it is contemplated that compounds of this invention form biologically active ingredients which may be employed as an essential ingredient in various compositions. The term "carrier," as used throughout the specification and claims, is intended to refer to the component or components comprising a major proportion of a composition or formulation of this invention, which carrier may include such diluents, extenders, fillers, conditioners, solvent, and the like as various clays, diatomaceous earth, talc, spent catalyst, alumina silica materials and such liquids as water and various organic liquids such as acetone, kerosene, benzene, toluene, xylene, and other petroleum distillate fractions or mixtures thereof. When liquid formulations are employed or dry materials prepared which are to be used in liquid form, it is desirable in certain instances additionally to employ a wetting, emulsifying or dispersing agent to facilitate use of the formulation, e.g., Triton X–155 (alkyl aryl polyether alcohol).

It is to be understood that although the invention has been described with specific reference to particular embodiments thereof, it is not to be so limited, since changes and alterations therein may be made which are within the full intended scope of this invention as defined by the appended claim.

What is claimed is:

The method of controlling the growth of microorganisms which comprises applying thereto a toxic amount of a composition containing 2,2,6-trimethyltetrahydro-1,3-oxazine as an essential active ingredient.

References Cited in the file of this patent

UNITED STATES PATENTS

| | | |
|---|---|---|
| 1,972,465 | Ulrich et al. | Sept. 4, 1934 |
| 2,250,408 | De Groote | July 22, 1941 |
| 2,629,740 | Carnes | Feb. 24, 1953 |
| 2,715,631 | Croxall et al. | Aug. 16, 1955 |
| 2,722,531 | Ratz | Nov. 1, 1955 |
| 2,754,244 | Gysin et al. | July 10, 1956 |
| 2,817,663 | Conlon et al. | Dec. 24, 1957 |

OTHER REFERENCES

Cope et al.: J. Am. Chem. Soc., vol. 64, 1942, pp. 1503–6.

Cope et al.: J. Am Chem. Soc., vol. 66, 1944, pp. 1453–4.